United States Patent
Vaattovaara et al.

(10) Patent No.: US 11,348,427 B2
(45) Date of Patent: May 31, 2022

(54) ACTIVE RFID TAG AND PRODUCT SURVEILLANCE METHOD

(71) Applicant: HALTIAN OY, Oulu (FI)

(72) Inventors: Teemu Vaattovaara, Oulu (FI); VilleYlläsjärvi, Oulu (FI); Marko Parttimaa, Oulu (FI); Jussi Kivilinna, Oulu (FI); Aleksandre Pekki, Oulu (FI); Juha Pikkarainen, Oulu (FI); Pertti Kujala, Oulu (FI); Jyrki Okkonen, Oulu (FI)

(73) Assignee: HALTIAN OY, Oulu (FI)

( * ) Notice: Subject to any disclaimer, the term of this patent is extended or adjusted under 35 U.S.C. 154(b) by 0 days.

(21) Appl. No.: 17/257,407

(22) PCT Filed: Jul. 3, 2018

(86) PCT No.: PCT/EP2018/067879
§ 371 (c)(1),
(2) Date: Dec. 31, 2020

(87) PCT Pub. No.: WO2020/007446
PCT Pub. Date: Jan. 9, 2020

(65) Prior Publication Data
US 2021/0272433 A1 Sep. 2, 2021

(51) Int. Cl.
*G08B 13/24* (2006.01)
*H04B 17/318* (2015.01)
(52) U.S. Cl.
CPC ..... *G08B 13/2462* (2013.01); *G08B 13/2417* (2013.01); *G08B 13/2485* (2013.01); *G08B 13/2488* (2013.01); *H04B 17/318* (2015.01)

(58) Field of Classification Search
CPC .............. G08B 13/2485; H04B 17/318; G06Q 10/0832; G06Q 10/087; H04W 4/02; H04W 4/029
See application file for complete search history.

(56) References Cited

U.S. PATENT DOCUMENTS

| | | | |
|---|---|---|---|
| 2007/0268138 | A1 | 11/2007 | Chung et al. |
| 2009/0124304 | A1 | 5/2009 | Twitchell, Jr. |

(Continued)

OTHER PUBLICATIONS

International Search Report and Written Opinion of the ISA for PCT/EP2018/067879, dated Mar. 28, 2019, 13 pages.

*Primary Examiner* — Mirza F Alam
(74) *Attorney, Agent, or Firm* — Nixon & Vanderhye PC

(57) ABSTRACT

Active radio-frequency identification, RFID, tag, and a product surveillance method using active RFID tags. The method includes: transmitting (202), by an active RFID tag, continuously a signal comprising an own identifier according to a predetermined schedule; receiving (204), by the active RFID tag, continuously a plurality of signals comprising a plurality of foreign identifiers transmitted by a plurality of other active RFID tags according to the predetermined schedule; measuring (206), by the active RFID tag, a received signal strength indication, RSSI, of each received signal; storing (208), by the active RFID tag, each foreign identifier of a signal whose RSSI exceeds a predetermined strength threshold; detecting (210), by the active RFID tag, that a signal with a stored foreign identifier is no more received according to the predetermined schedule and marking (212), by the active RFID tag, said stored foreign identifier.

12 Claims, 4 Drawing Sheets

(56) References Cited

U.S. PATENT DOCUMENTS

| | | | |
|---|---|---|---|
| 2012/0154147 A1* | 6/2012 | Cao | G08B 21/0227 |
| | | | 340/539.13 |
| 2016/0232484 A1* | 8/2016 | Skaaksrud | G06Q 10/0836 |
| 2016/0370452 A1* | 12/2016 | Loverich | G06Q 10/0833 |
| 2017/0108577 A1* | 4/2017 | Loverich | G01S 5/02 |

* cited by examiner

ACTIVE RFID TAG AND PRODUCT SURVEILLANCE METHOD

This application is the U.S. national phase of International Application No. PCT/EP2018/067879 filed 3 Jul. 2018, which designated the U.S., the entire contents of which is hereby incorporated by reference.

FIELD

The invention relates to an active radio-frequency identification, RFID, tag, and to a product surveillance method using active RFID tags.

BACKGROUND

Active RFID tags operate with a limited power supply, which causes that the radio transceiver of the active RFID tag operates with a short communication range, utilizing the Bluetooth low energy technology, for example. If a large number of active RFID tags are located in a small area, in a container or in a warehouse, for example, the communication between an RFID reader and all the active RFID tags becomes very time and resource consuming or even impossible due to radio frequency congestion.

BRIEF DESCRIPTION

The present invention seeks to provide an improved active RFID tag, and an improved product surveillance method using active RFID tags.

According to an aspect of the present invention, there is provided an active RFID tag as specified in claim 1.

According to another aspect of the present invention, there is provided a product surveillance method using active RFID tags as specified in claim 12.

The invention may provide one or more of the following advantages: as transmission power is normally kept low, collisions are avoided, both features saving power, as simple active RFID tags with cheap radio transceivers but no other sensors (such as acceleration or location sensors) are used, the solution is both simple and cheap, and the exclusion of the other sensors also saves power.

LIST OF DRAWINGS

Figure 1A:
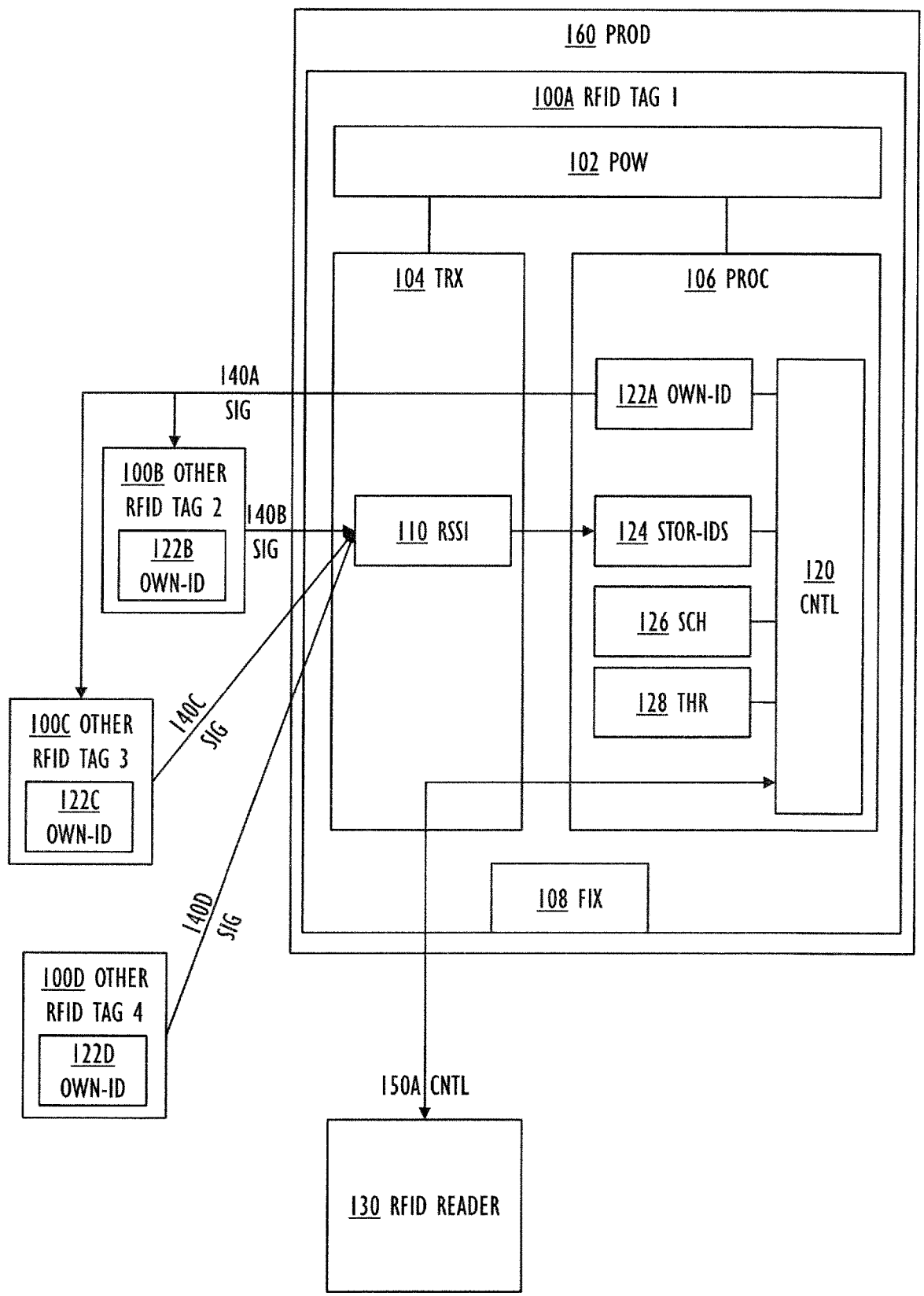
Figure 1B:
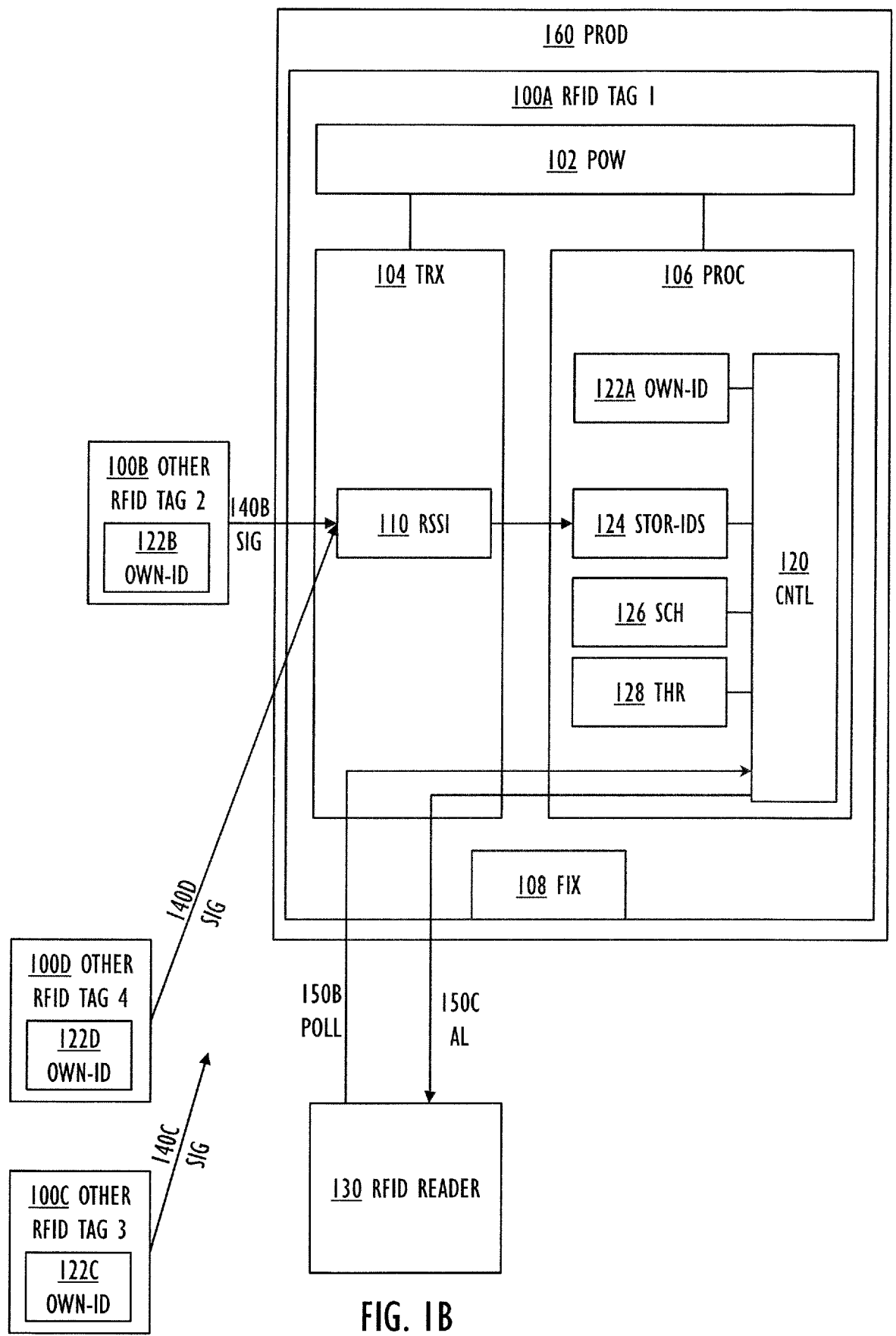
Figure 1C:
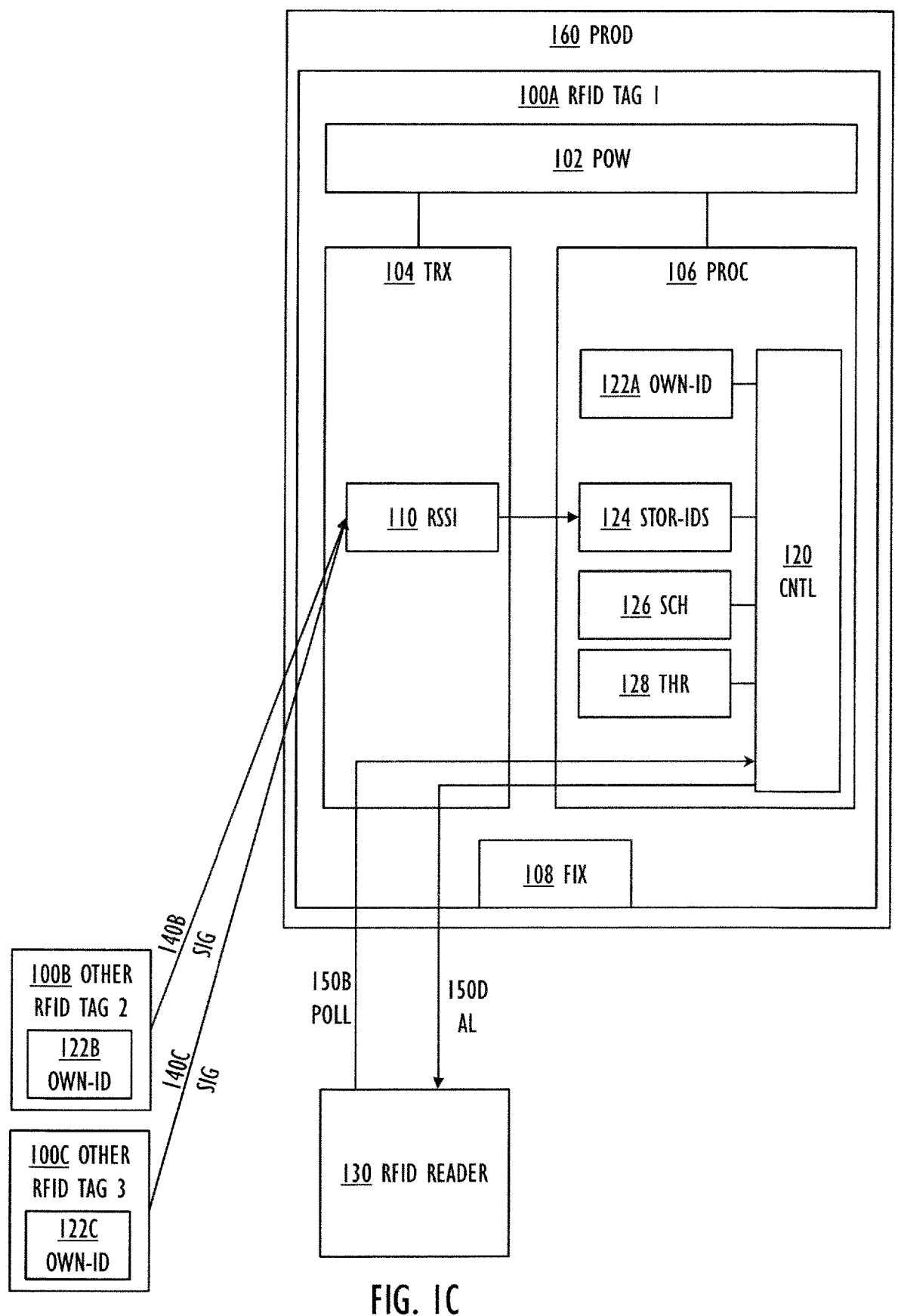
Figure 2:
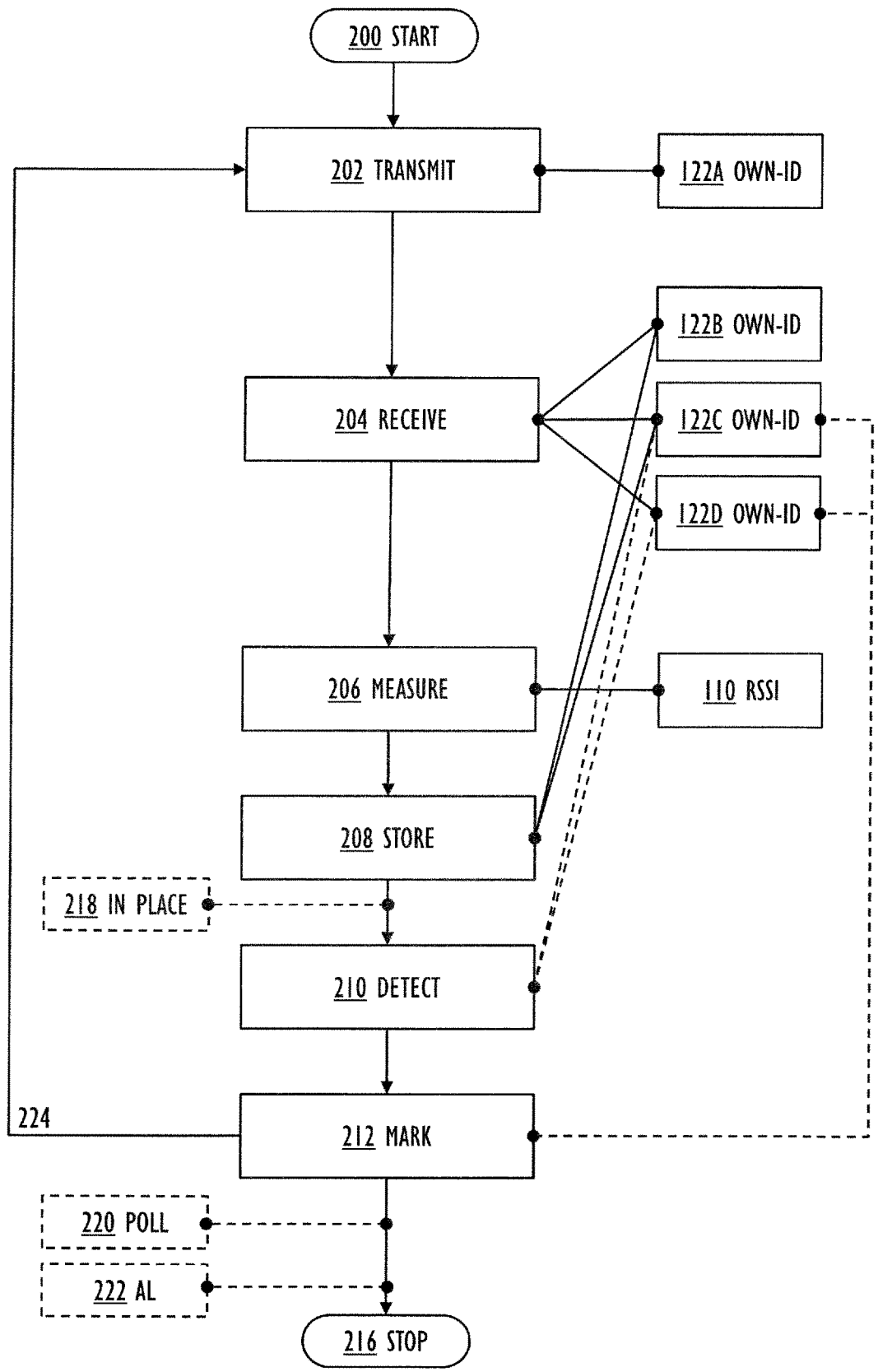

Example embodiments of the present invention are described below, by way of example only, with reference to the accompanying drawings, in which FIGS. 1A, 1B and 1C illustrate example embodiments of active RFID tags and an RFID reader; and FIG. 2 illustrates example embodiments of a product surveillance method using the active RFID tags.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Let us study simultaneously both FIGS. 1A, 1B and 1C, which illustrate example embodiments of active RFID tags 100A, 100B, 100C, 100D and an RFID reader 130, and FIG. 2, which illustrates example embodiments of a product surveillance method using the active RFID tags 100A, 100B, 100C, 100D. Each product 160 may comprise an active RFID tag 100A, 100B, 100C, 100D.

Note that in FIG. 1A four active RFID tags are illustrated: the operations are explained from the point of view of the active RFID tag 100A, whereas three other active RFID tags 100B, 100C, 100D are called 'other' active RFID tags as they interoperate with the tag 100A. Note also that there is a plurality of other RFID tags 100B, 100C, 100D, meaning that their number may be very high, hundreds or thousands, or even more. Each active RFID tag 100A has an identifier:
- the active RFID tag 100A has an own identifier 122A; and
- the other active RFID tags 100B, 100C, 100D each have an own identifier 122B, 122C, 122D (also called 'foreign' identifiers from the point of view of the active RFID tag 100A).

The identifiers 122A, 122B, 122C, 122B may be globally unique, or unique within a specified application domain.

The active RFID 100A may be encapsulated in a protective (dustproof and/or waterproof) casing. Alternatively, the active RFID tag 100A may be manufactured with printed electronics on a flexible foil or paper. Other suitable manufacturing methods may also be applied.

The active RFID tag 100A comprises a power source 102, a radio transceiver 104, and a processing unit 106, which is coupled with the power source 102 and the radio transceiver 104. The other active RFID tags 100B, 100C, 100D have a similar construction.

The power source 102 may be a battery (disposable or rechargeable) or another type of a portable energy storage.

The radio transceiver 104 may operate according to any of the various standard/proprietary technologies utilizing various frequency bands and communication protocols. Standards include but are not limited to: 802.11 WLAN and various Bluetooth standards including Bluetooth low energy, BLE.

The processing unit 106 may be implemented with a processor (such as a microprocessor or a microcontroller) and software, as an integrated circuit, as an application-specific integrated circuit (ASIC), or as any other way of implementing a device that is capable of storing and processing data of the active RFID tag 100A.

The active RFID tag 100A, 100B, 100C, 100D may comprise a fixing 108 attachable to the product 160 or a package of the product 160.

The processing unit 106 is configured to cause the execution of the method of FIG. 2.

The method of FIG. 2 starts in 200.

In 202, a signal 140A comprising the own identifier 122A is transmitted continuously according to a predetermined schedule 126 by the active RFID tag 100A.

In 204, a plurality of signals 140B, 140C, 140D comprising the plurality of foreign identifiers 122B, 122C, 122D transmitted by the plurality of the other active RFID tags 100B, 100C, 100D are received continuously according to the predetermined schedule 126 by the active RFID tag 100A.

In 206, a received signal strength indication, RSSI 110, of each received signal 140B, 140C, 140D is measured by the active RFID tag 100A. RSSI 110 defines a measurement of the power present in the received radio signal 140B, 140C, 140D.

In 208, each foreign identifier 122B, 122C of a signal 140B, 140C whose RSSI 110 exceeds a predetermined strength threshold 128 is stored by the active RFID tag 100A. In our example embodiment of FIG. 1A, we assume that the other active RFID tag 100D is so far away from the active RFID tag 100A that its signal 140D does not exceed the predetermined strength threshold 128.

In an example embodiment, the processing unit 106 is configured to cause the following: storing 208 at most a predetermined number of foreign identifiers 122B, 122C whose RSSIs 110 have the greatest values. This means that the identifiers of those signals that are received best are stored. The predetermined number may be eight, for example, but depending on the use case also other integer numbers greater than one are applicable.

In 210, it is detected that a signal 140C with a stored foreign identifier 122C is no more received according to the predetermined schedule 126 by the active RFID tag 100A, and in 212, said stored foreign identifier 122C is marked by the active RFID tag 100A. In our example embodiment of FIG. 1B, we assume that the other active RFID tag 100C has moved so far away from the active RFID tag 100A that its signal 140C is no more received.

In an example embodiment, the processing unit 106 is configured to cause the following: detecting 210 that the signal 140C with the stored foreign identifier 122C is no more received according to the predetermined schedule 126 also if the RSSI of the signal 140C is below the predetermined strength threshold 128.

Note that in FIG. 1B, the signal 140B is still received and exceeds the predetermined strength threshold 128, whereas the signal 140D is also still received but does not exceed the predetermined strength threshold 128.

The method ends in 216 after the processing is finished, or the operation loops back from the operation 212 (or 222) to 202 in order to continue the processing as long as required or as long as the power source 102 permits.

In essence, the described operation sequence 202-204-206-208-210-212 enables detection that one or more signals are no more received, meaning that products to which the active RFID tags are attached have moved, i.e., the products have moved. In product surveillance, it is essential to detect movement of the products. The RFID reader 130 performs the surveillance by exchanging control information with the active RFID tag 100A. Note that the example embodiments are described from the point of view of the active RFID tag 100A, but also the other active RFID tags 100B, 100C, 100D perform the same internal operations. In this way, the active RFID tags 100A, 100B, 100C, 100D are bonded (or "glued" or linked) to each other in such a way that each active RFID tag knows the existence of the nearest active RFID tags, and also detects if some active RFID tag has moved (due to the product being stolen, for example).

In an example embodiment, the processing unit 106 is configured to cause the following: transmitting 222, with a higher transmission power than the signal 140A comprising the own identifier 122A, an alarm signal 150C after said stored foreign identifier 140C has been marked. In our example embodiment of FIGS. 1A and 1B, the active RFID tag 100A transmits the alarm signal 150C to the RFID reader 130.

In an example embodiment, the processing unit 106 is configured to cause the following: receiving 220 a polling signal 150B from the RFID reader 130; and in response to the polling signal 150B, transmitting 222 the alarm signal 150C indicating that said stored foreign identifier 122C has been marked.

So, there are at least two ways for the RFID reader 130 to detect the alarm signal 150C: the alarm signal 150C is transmitted with the higher transmission power than the signal 140A (meaning that the alarm signal 150C is easier to detect and it also has a longer range), or the alarm signal 150C is polled.

For product surveillance purposes, FIGS. 1B and 1C, when compared to the initial situation of FIG. 1A, describe two different scenarios:

in FIG. 1B, the active RFID tag 100A has remained stationary, whereas the other active RFID tag 100C has moved;

in FIG. 1C, the active RFID tag 100A has moved, whereas the other active RFID tags 100B and 100C have remained stationary.

For the first scenario of FIG. 1B, the processing unit 106 is configured to cause the following: if only one stored foreign identifier is marked 122D, transmitting 222 an alarm signal 150C indicating that the other active RFID tag 100C having said stored foreign identifier 122C has been moved.

For the second scenario of FIG. 1C, the processing unit 106 is configured to cause the following: if two or more stored foreign identifiers 122C, 122D are marked, transmitting 222 an alarm signal 150D indicating that the active RFID tag 100A having the own identifier 122A has been moved.

Note that if the RFID reader 130 is out of range of the alarm signal 150C, there may be repeater functionality: each active RFID tag may repeat the received alarm signal 150C, which finally arrives to the range of the RFID reader 130. For this purpose, the active RFID tags 100A, 100B, 100C, 100D may form a mesh network.

In an example embodiment, the processing unit 106 is configured to cause the following: after the storing 208 and before the detecting 210 and marking 212, receiving 218 a control signal from the RF reader 130 indicating that the plurality of the other active RFID tags 100B, 100C are in place. With this feature, the status of the products 160 is frozen to a static state: all products 160 are in place, and if some product is (lawlessly) removed, it will be detected, as its signal is no more received by the active RFID tags of other products.

In an example embodiment, the processing unit 106 is configured to cause the following: performing the operations 202, 204, 206, 208, 210, 212 during loading and transportation of the plurality of the products 160. With this example embodiment, the products 160 may be loaded into a container (or into a cargo space of a van, truck, ship or airplane, for example) and transported, and if any product is removed, the RFID reader(s) 130 placed in the container will detect this.

In an example embodiment, the processing unit 106 is configured to cause the following: performing the operations 202, 204, 206, 208, 210, 212 during reception and storage of the plurality of the products 160. With this example embodiment, the products 160 may be placed under surveillance in a storehouse or shop, for example. If any product is moved, the RFID reader 130, or a plurality of RFID readers, placed in the storehouse or shop, will detect this.

It will be obvious to a person skilled in the art that, as technology advances, the inventive concept can be implemented in various ways. The invention and its embodiments are not limited to the example embodiments described above but may vary within the scope of the claims.

The invention claimed is:

1. An active radio-frequency identification, RFID, tag, comprising:
   a power source;
   a radio transceiver; and
   a processor, coupled with the power source and the radio transceiver, and configured to cause operations comprising:
      transmitting continuously a signal comprising a self-identifier according to a predetermined schedule;
      receiving continuously a plurality of signals comprising a plurality of foreign identifiers transmitted by a plurality of other active RFID tags according to the predetermined schedule;
      measuring a received signal strength indication, RSSI, of each received signal;
      storing each foreign identifier of a signal whose RSSI exceeds a predetermined strength threshold; and
      detecting that a signal with a stored foreign identifier is no longer received according to the predetermined schedule and marking said stored foreign identifier.

2. The active RFID tag of claim 1, wherein the processor is configured to cause further operations comprising storing no more than a predetermined number of foreign identifiers whose RSSIs have the greatest values.

3. The active RFID tag of claim 1, wherein the processor is configured to cause further operations comprising detecting that the signal with the stored foreign identifier is no longer received according to the predetermined schedule if the RSSI of the signal is below the predetermined strength threshold.

4. The active RFID tag of claim 1, wherein the processor is configured to cause further operations comprising transmitting, with a higher transmission power than the signal comprising the self-identifier, an alarm signal after said stored foreign identifier has been marked.

5. The active RFID tag of claim 1, wherein the processor is configured to cause further operations comprising:
   receiving a polling signal from an RFID reader; and
   in response to the polling signal, transmitting an alarm signal indicating that said stored foreign identifier has been marked.

6. The active RFID tag of claim 1, wherein the processor is configured to cause further operations comprising if only one stored foreign identifier is marked, transmitting an alarm signal indicating that the other active RFID tag having said stored foreign identifier has been moved.

7. The active RFID tag of claim 1, wherein the processor is configured to cause further operations comprising if two or more stored foreign identifiers are marked, transmitting an alarm signal indicating that the active RFID tag having the self-identifier has been moved.

8. The active RFID tag of claim 1, wherein the processor is configured to cause further operations comprising after the storing and before the detecting and marking, receiving a control signal from an RF reader indicating that the plurality of the other active RFID tags are in place.

9. The active RFID tag of claim 1, further comprising a fixing attachable to a product or a package of the product.

10. The active RFID tag of claim 9, wherein the processor is configured to perform the operations during loading and transportation of the plurality of the products.

11. The active RFID tag claim 9, wherein the processor is configured to perform the operations during reception and storage of the plurality of the products.

12. A product surveillance method using active radio-frequency identification, RFID, tags, the method comprising:
   transmitting, by an active RFID tag, continuously a signal comprising a self-identifier according to a predetermined schedule;
   receiving, by the active RFID tag, continuously a plurality of signals comprising a plurality of foreign identifiers transmitted by a plurality of other active RFID tags according to the predetermined schedule;
   measuring, by the active RFID tag, a received signal strength indication, RSSI, of each received signal;
   storing, by the active RFID tag, each foreign identifier of a signal whose RSSI exceeds a predetermined strength threshold; and
   detecting, by the active RFID tag, that a signal with a stored foreign identifier is no longer received according to the predetermined schedule and marking, by the active RFID tag, said stored foreign identifier.

* * * * *